United States Patent [19]

Fraser et al.

[11] Patent Number: 4,852,127
[45] Date of Patent: Jul. 25, 1989

[54] UNIVERSAL PROTOCOL DATA RECEIVER

[75] Inventors: Alexander G. Fraser, Bernardsville; William T. Marshall, Chatham; Guy G. Riddle, Piscataway, all of N.J.

[73] Assignee: American Telephone and Telegraph Company, AT&T Bell Laboratories, Murray Hill, N.J.

[21] Appl. No.: 714,834

[22] Filed: Mar. 22, 1985

[51] Int. Cl.[4] .......................................... H04L 27/06
[52] U.S. Cl. ...................................... 375/94; 375/99; 371/34
[58] Field of Search .................. 375/7, 37, 108, 99, 375/94; 340/825.54; 371/53, 34, 38, 39; 179/18 ES; 365/190, 191, 195; 370/80, 84, 108

[56] References Cited

U.S. PATENT DOCUMENTS

| Re. 31,319 | 7/1980 | Fraser | 370/80 |
|---|---|---|---|
| 3,453,592 | 11/1963 | Ishii et al. | 371/34 |
| 3,753,227 | 8/1973 | Patel | 371/53 |
| 3,805,234 | 4/1974 | Masters | 371/34 |
| 3,909,526 | 9/1975 | Fretwell et al. | 375/109 |
| 3,910,322 | 10/1975 | Hardesty, Jr. et al. | 371/34 |
| 3,924,245 | 12/1975 | Eaton et al. | 364/200 |
| 4,112,258 | 9/1978 | Alles | 179/18 ES |
| 4,251,885 | 2/1981 | Dodt et al. | 271/53 |
| 4,271,513 | 6/1981 | Maejima et al. | 371/34 |
| 4,280,217 | 7/1981 | Hafer et al. | 179/18 ES |
| 4,322,576 | 3/1982 | Miller | 370/99 |
| 4,371,929 | 2/1983 | Brann et al. | 364/200 |
| 4,499,576 | 2/1985 | Fraser | 370/60 |
| 4,521,776 | 6/1985 | Smoot et al. | 340/825.54 |
| 4,534,031 | 8/1985 | Jewer | 371/38 |

OTHER PUBLICATIONS

Motorola VME Modules Mc68000 High Performance 16 Bit Modular Products . . . in a World-Wide Standard Package, 1982.

Primary Examiner—Robert L. Griffin
Assistant Examiner—Stephen Chin
Attorney, Agent, or Firm—Robert O. Nimtz; Henry T. Brendzel

[57] ABSTRACT

A universal protocol data receiver is disclosed which is capable of receiving data streams in character mode and block mode, providing flow control and error detection and correction. The receiver is divided into two stages separated by a first-in, first-out buffer register. The first stage handles flow control and error processing as well as initialization. The second stage handles interfacing with the data utilizing mechanism and flow control acknowledgements. The FIFO buffer is divided into two parts by a movable barrier which limits the access of the second stage. The barrier permits error processing by hiding incoming blocks of data behind the barrier until processing is complete. Both a hardware and a software implementation of the receiver are disclosed.

9 Claims, 1 Drawing Sheet

UNIVERSAL PROTOCOL DATA RECEIVER

TECHNICAL FIELD

This invention relates to data transmission systems and, more particularly, to a universal protocol receiver for such data transmission systems.

BACKGROUND OF THE INVENTION

In the field of data transmission, the wide variety of data communications terminals, the widely varying traffic characteristics and the requirements of the communications network have all contributed to the great complexity and, by and large, the essential incompatibility of different data transmission systems. At the same time, the increasing dependence on data transmission and the need for interconnecting various terminal and computer equipment have made a flexible approach to data transmission essential.

The protocol for data transmission can be divided into a hierarchy having at least the following lowest three levels:

Level A—This is the physical level and deals with the electrical voltage and current levels and bit synchronization.

Level B—This is the data link level and deals with error detection, multiplexing and envelope (byte) level synchronization.

Level C—This is the data packet level and deals with error control, flow control and packet level synchronization.

Level A and B protocols are relatively easy to implement and, when necessary, to convert between different standards. Level C protocols, on the other hand, are complex, difficult to implement, and even more difficult or even impossible to convert between. Moreover, protocol definition is a difficult art, and protocol standards are bulky, ambiguous and difficult to verify. Finally, a large amount of equipment is already in place which operates according to one of the existing and largely incompatible protocols. These existing protocols include Bisync, SDLC, HDLC, X.25 (level 3), start/stop and raw byte streams.

The problem, then, is how to design a data transmission network which can interface with terminal equipment designed to operate according to a wide variety of different level C protocols.

SUMMARY OF THE INVENTION

In accordance with the illustrative embodiment of the present invention, a standard data receiver rather than a standard protocol is provided. The standard receiver has sufficient flexibility and capability to accept data in a large number of different protocols and to support the major features of each.

More specifically, the standard receiver is capable of operating in block (multiple byte) mode or character (single byte) mode. It contains a data buffer and responds to a repertoire of data flow control commands which implement all of the major features of Bisync, SDLC, HDLC, TCP, X.25 level 3, start/stop and raw byte streams.

More specifically, the standard receiver is divided into two stages separated by a buffer register. The first stage handles packet acceptance processes and the other, data flow control commands. The second stage interfaces with the local user and includes acknowledgement command processing.

In accordance with one feature of the present invention, the buffer memory between the receiver stage is a FIFO (first in, first out) memory with a movable barrier dividing the buffer into two parts, only one of which is accessible to the second stage of the receiver. Stage one moves the buffer barrier after verifying the buffer data, thus minimizing the amount of buffer storage required.

In accordance with another feature of the present invention, the standard receiver can be realized in hardware as a VLSI chip or in a standard piece of software.

BRIEF DESCRIPTION OF THE DRAWING

In the FIGURE there is shown a detailed block diagram of a data receiver in accordance with the present invention.

DETAILED DESCRIPTION

Figure 1:
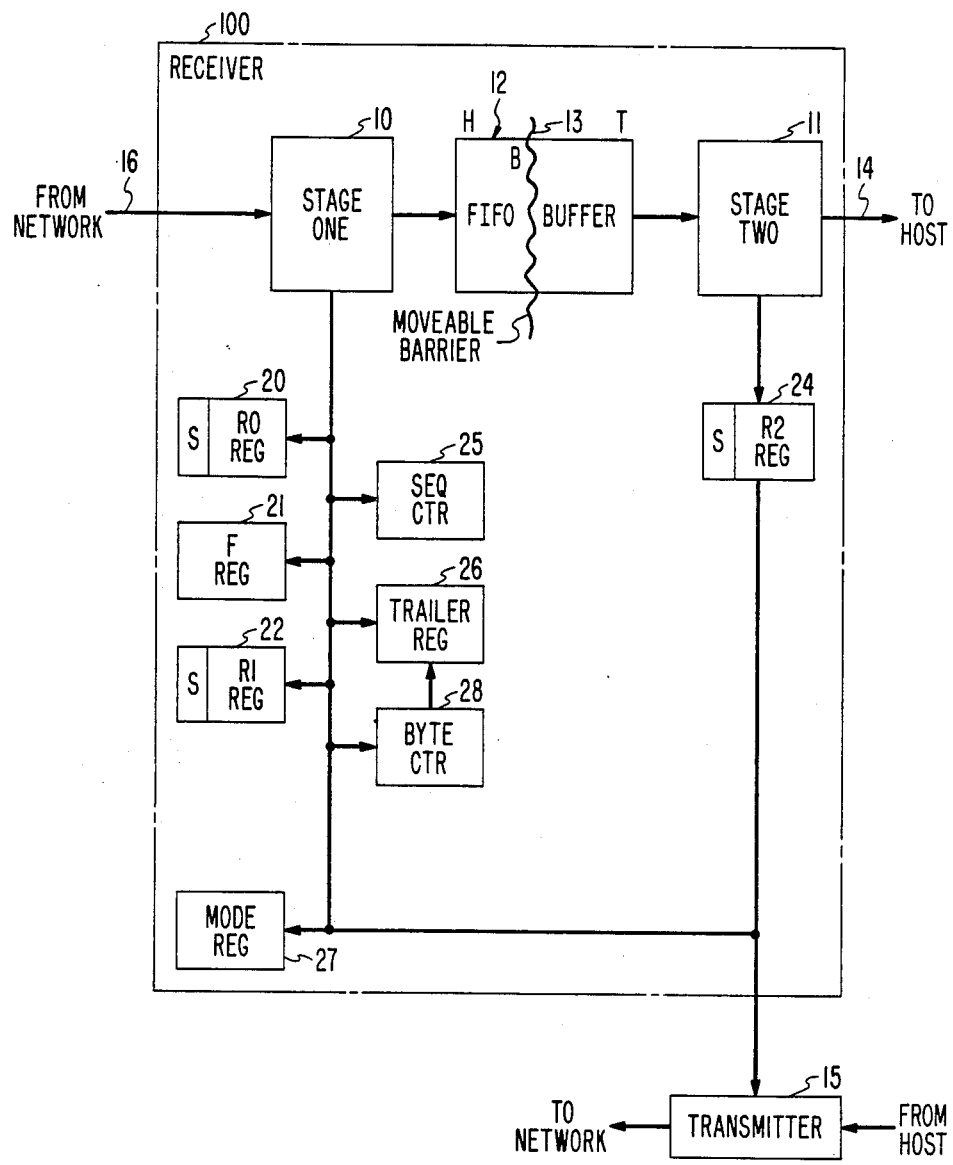

One illustrative type of transmission system with which the present invention is useful is one in which the basic data stream consists of a sequence of nine-Bit bytes (Level B protocol). The ninth bit indicates whether the remaining bits are data or control codes. The control codes are used for enforcing protocols at all levels. Although the invention will be described in connection with such a transmission system, other types of transmission systems could readily take advantage of the present invention in a manner obvious to those skilled in the art.

In order to permit a single receiver to process data received in all of the possible level C protocols, it is necessary to utilize standard control codes which have the same or similar meaning for all protocols. Moreover, a standard block format is necessary to permit block error processing. A block of data is a plurality of data bytes accompanied by control information. In accordance with one feature of the illustrative embodiment of the present invention, all blocks of data have appended to them a four-byte trailer. The first byte is a beginning-of-trailer (BOT) control code; the second and third bytes (L1, L2) represent the number of data bytes in the block, and the last byte is a control code which includes a sequence number (SEQ−i). The sequence numbers of successive blocks are incremented by one, modulo eight. That is, the sequence numbers take on the values 0 through 7 in successive blocks and are used for error control. Other moduli could, of course, be selected.

It will be noted that blocks have no headers, and all control information is in the trailer. Since header information must be stored until an entire block is received and checked, no purpose is served in putting any control information in a header. In accordance with the present invention, all control information is placed in a trailer following the variable length block of data bytes.

It will be noted that the trailer format described above is dependent upon byte error detection and deletion at a lower protocol level, typically Level B. With this assumption, the byte length in the trailer is sufficient to detect block error.

The five possible types of data streams which require level C protocols have been summarized by Table 1, where the rows represent the various types of error control: none, error detection without correction, and error correction by retransmission. The columns in Table 1 represent the absence or presence of flow control, i.e., the ability of the receiver to interrupt the data stream being sent by the transmitter.

TABLE 1

| | PROTOCOL TABLE | | |
|---|---|---|---|
| Error | Flow Control | | Data |
| Control | No | Yes | Format |
| None | Type 1 | Type 2 | Character |
| Detect | Type 3 | Type 4 | Block |
| Correct | — | Type 5 | Block |

It can be seen that there are five different types of data streams possible. The bottom row has only one entry (Type 5) since correction by retransmission is not possible without flow control.

A Type 1 data stream contains no level C control codes and provides no error control or flow control. Such a data stream is useful for very short transactions and for real time data. Some examples include alarm system data, voice codes, and input from slow terminals.

A type 2 data stream requires flow control to prevent loss of data due to speed mismatches between the transmitter and the receiver, but data bytes may be dropped if transmission errors occur. Output from a host machine to a terminal falls into this category, as well as slow speed transmission over telephone lines.

Types 3 and 4 data streams are received correctly or completely ignored, a block at a time. This type of data stream is used in synchronous systems such as ETHERNET (Trademark of Xerox Corporation). Type 3 data streams cannot be interrupted and the end user must supply a windowing scheme to prevent overflow. Type 4 data streams do provide flow control to accommodate transmitter/receiver speed mismatches.

A Type 5 data stream provides error-free transmission by the retransmission of lost or mutilated blocks. This is the standard method of communication between host machines.

An exemplary set of control codes suitable for controlling a universal data receiver in accordance with the present invention is shown in Table 2.

TABLE 2

| | CONTROL CODES | |
|---|---|---|
| Name | Octal Code | Description |
| SEQ | 010 . 017 | Sequence codes for end trailer, numbered 0 to 7. |
| ECHO | 020 . 027 | Echo codes for signaling that correct data has been passed to host, numbered 0 to 7. |
| REJ | 030 . 037 | Rejection codes for signaling a remote transmitter of errors in transmission, numbered 0 to 7. |
| ACK | 040 . 047 | Acknowledgement codes for signaling a remote transmitter of successful reception, numbered 0 to 7. |
| BOT | 050 | Beginning of trailer for regular blocks of data. |
| BOTM | 051 | Beginning of M-type block trailer. |
| BOTS | 052 | Beginning of S-type block trailer. |
| BOU | 053 | Start of unnumbered block. |
| EOU | 054 | End of unnumbered block. |
| ENQ | 055 | Transmitter request for flow or error status. |
| CHECK | 056 | Transmitter request for error status. |
| INITREQ | 057 | Request initialization from transmitter. |
| INIT0 | 060 | Character mode initialization. |
| INIT1 | 061 | Block mode initialization. |
| AINIT | 062 | Acknowledgement of INIT0 or INIT1. |

Hardware implementations of transmitters for the various Type 1 through Type 5 data streams will not be shown in detail. Software implementations of one embodiment of each of these transmitters will be disclosed for logical comprehensiveness.

In the FIGURE there is shown a detailed block diagram of a hardware implementation of a universal data receiver 100 in accordance with the present invention comprising a first stage 10 and a second stage 11 separated by a first-in, first-out multistage buffer register 12. Buffer register 12 is divided into two parts by a movable barrier 13 which, under the control of control circuits in the first stage 10, can be moved to any storage position of buffer register 12. Buffer register 12 is a standard "first-in, first-out (FIFO)" register and the movable barrier can easily be implemented by range registers in the access circuits. One such implementation is disclosed in the pending application of A. G. Fraser, Ser. No. 407,877, filed Aug. 13, 1982.

The FIFO memory 12 between stages 10 and 11, including a barrier 13, divides buffer 12 into two parts. Only the part to the right (towards the head H) of barrier 13 is available to stage 11. Indeed, stage 11 perceives barrier 13 as the end or tail of the buffer, and when the barrier 13 is at the lead H of the buffer 12, stage 11 perceives buffer 12 as empty. Stage 10 can move barrier 13 around in buffer 12 and, in particular, can move barrier 13 to the tail T of buffer 12, thus making the entire buffer 12 available to stage 11. Stage 10 can also move the tail T to the barrier 13, thereby effectively deleting data stored to the left of barrier 13. In operation in the block mode, the barrier 13 is used to make blocks unavailable to stage 11 until after trailer verification, at which time the barrier is moved to the left of the verified block if the block is valid, or the tail is moved to the barrier if the block is not valid.

ECHO codes, generated at the end of each valid block, are returned to the remote transmitter only after the corresponding data bytes are read out of buffer 12 and passed on to the host computer. Rejection codes, generated at the end of each invalid block, are substituted for the invalid block in buffer 12 and sent back to the transmitter when reached by stage 11. ECHO codes are also returned when a SEQ code is received in the character mode.

It will be thus seen that stage 10 and stage 11 access buffer 12 asynchronously, stage 10 loading buffer 12 as data is received, and stage 11 emptying buffer 12 as fast as the host computer can accept data.

In all types of data streams with error control, invalid data blocks are simply discarded. In Type 5 systems, the transmitter holds the block after transmission until either an ECHO acknowledgement is received or a REJ is received. If an ECHO code is received, the block with the next sequence number is transmitted. If a REJ code is received, the block with the same sequence number is retransmitted.

The data receiver of the figure is capable of receiving data in all of the Type 1 through Type 5 protocols. In accordance with the present invention, a single standard protocol definition is avoided by providing a standard receiver of sufficient flexibility to provide virtually al of the functions required by the many different data protocols. Such a standard receiver greatly simplifies the creation of large and complex data networks, including data links using many different data protocols.

In order to achieve such universal flexibility, the standard data receiver must be capable of operating in either of two modes, a block mode or a character mode. To this end, the first stage of the receiver of the figure is able to recognize initialization commands from a distant transmitter. Initialization commands are then used to set the receiver 100 of the figure to the appropriate mode, block or character. In the character mode, stage 10 passes data characters and flow control characters on to buffer register 12 as they are received. The second stage 11 of the receiver of the figure passes the data characters on to the data utilization circuits connected to output leads 14, and notifies the local transmitter 15 when a flow-control character (an ECHO or a REJ) is removed from buffer register 12. This notification is thereafter used to signal the remote transmitter of the proper (or erroneous) reception of the transmitted data. The receiver of the figure also responds to requests from the distant transmitter (connected to transmission line 16) about the last flow-control character taken out of buffer register 12. This information is used to properly restart the distant transmitter if an acknowledgement code is lost.

It should be noted that "data" or "bytes" in this connection is anything other than the control codes of Table 2. This will include control codes to be used for implementing protocols at other levels.

In the block mode, buffer register 12 contains complete, validated data blocks rather than single data characters. A complete valid data block consists of a plurality of data envelopes (which may be zero), followed by a trailer. As in the character mode, the transmitter 15 is notified when flow control codes are removed from buffer 12. The receiver 100 of the figure will also respond to the remote transmitter to provide the identity of the last block placed in buffer 12 or the last block removed from buffer 12. The receiver 100 of the figure will also notify the remote transmitter if an incomplete or out-of-sequence block is received.

In the block mode, data is grouped into packets of data envelopes followed by a trailer of four envelopes. The first trailer envelope is a control character marking the "beginning of trailer" (BOT). The second and third envelopes of the trailer contain a two-byte (L1 and L2) representation of the length L of the packet (i.e., the number of data envelopes, which can vary from block to block), while the last envelope contains the sequence control code (SEQ) of the packet, along with a sequence number between 0 and 7. Thus, eight distinguishable sequence codes can be received, one for each of the eight different sequence numbers. This type of error control serves to check that no part of a packet is lost (length) and that no complete packet is lost (sequence number).

In general, the receiver 100 of the figure passes Type 1 and Type 2 data streams directly through the receiver 100, since no error control is being used. In Types 3, 4, and 5, where error control is being used, data is buffered in buffer 12 until it is verified, using the trailer information. In Types 3 and 4 streams, the erroneous data block is simply discarded, while in Type 5 erroneous data blocks are discarded, but retransmitted by the remote transmitter.

Flow control (Types 2, 4, and 5) is implemented by the sequence number codes. These sequence codes (together with the associated ECHO and REJ codes), permit the transmitter to know at all times how much information is in process at the receiver. In Type 2 data streams, sequence number codes are interspersed in the data stream at intervals and monitored, together with the ECHO codes, to prevent overflow of the buffer 12. In Types 4 and 5 data streams, the sequence number code forms part of the trailer, and serves the same function.

It will be noted that the choice of a trailer format that begins with one control code and ends with another control code minimizes the effect of errors occurring in the trailer itself. Similarly, having the length precede the sequence number also minimizes the effect of errors, requiring three independent errors for an erroneous sequence to be accepted as a valid data block. If the transmitter has only seven blocks outstanding at any given instant, then no combination of errors can lead to acceptance of an incorrect block. The sequence numbers are cyclic, modulo eight, in the illustrative embodiment of the error control system.

With the above as background, the description of the figure will be continued. In the figure, R0 register 20, R1 register 22, and R2 register 24 are all control code registers. R0 register 20 holds control codes representing replies from the distant receiver for controlling transmitter 15. R1 register 22 contains the control codes to be sent from the receiver of the figure to the remote transmitter, except the block validation/rejection codes. R2 register 24 contains the block validation/rejection code for each type of data stream except Type 1 (which does not use validation). Separate registers for each of the various codes could also be supplied if desired.

Each of registers 20, 22, 23 and 24 has an extra "S" (status) bit which is set when a control code is entered into the corresponding register (by stage 10 or stage 11) and which is reset by transmitter 15 when the code is read from the corresponding register. Code registers 20 through 24 implement all of the protocols described above. In general, reply register 20 holds reply codes from a remote receiver, like receiver 100, connected through the network to transmitter 15. These reply codes include ACK, ECHO, REJ, AINIT, and INITREQ codes from the remote receiver and will be described later in connection with replies made by receiver 100.

Three local variable registers 25, 26, and 28 are provided to temporarily store conditions in receiver 100. More specifically, sequence number counter 25 counts successive valid data blocks received by receiver 100 as they are passed on to the host. This sequence number is used to check the validity of received sequence numbers in the trailer blocks and is used to form the ECHO, ACK, and REJ codes for signaling the remote transmitter.

Trailer register 26 holds received trailer codes until the length and sequence numbers are checked for validity. Mode register 27 is a one-bit register which is set when in the block mode (by an INIT1 code) and reset when in the character mode (by an INIT0 code). The initial or default mode is the character mode. Byte counter 28 counts received data bytes for comparison with the length count in the trailer register 26.

In the character mode, the receiver 100 of the figure operates as follows: The first control code received is an INIT0 code which, when received in stage 10, resets mode register 27 to the character mode (if it is not already there). At the same time, trailer processing is disabled (if previously enabled) and R1 register 22 is loaded with the AINIT code. Transmitter 15 places the AINIT code from R1 register 22 in the outgoing digital stream in the next available byte window. This return code, like all of the other return codes, can be interposed anywhere in the data stream and will be responded to appropriately at the remote receiver. These return codes are removed at the remote receiver before the blocks are reformed. The movable barrier 13 is moved to the tail T of buffer register 12 to flush (effectively empty) the buffer 12 and make the entire buffer register unavailable to stage 11.

All of the following data bytes are loaded into buffer register 12 at the tail T, and the barrier B moved to the end of each new added byte. Stage 1 immediately begins removing these data bytes and passing them on to the host machine via line 14.

If the character mode data stream is Type 2, sequence codes will be interspersed at intervals in the data stream. When one of these sequence codes is received at stage 10, it is translated to (ECHO +i), where "i" is the same sequence number at the received SEQ codes and passed onto buffer register 12. When received at stage 11, the (ECHO+i) code is placed in R2 register 24. Transmitter 15 introduces the (ECHO +i) code into its outgoing data stream in the next available byte window. The ECHO returns can then be used by the remote transmitter to control the interruption and resumption of data transmission for speed matching. The transmitter uses sequence numbers cyclically, modulo eight, and blocks transmission when the next sequence number to be sent matches the most recently received ECHO sequence number. Thus, at most, seven data blocks must by buffered at the receiver 100 in register 12, in order to accommodate data speed mismatches. The value i is saved in sequence counter 25.

The remote transmitter is protected against lost ECHO or ACK codes by a timeout circuit. If a timeout occurs before the expected ECHO code is received, the transmitter issues and ENQ code. When received by stage 10, the ENQ code sets one-bit F register 21 and causes the most recent (ECHO+i) code to be retransmitted from R2 register 24, followed by an (ACK+j) code, where j is the most recent sequence number received by stage 10 and stored in sequence counter 25. The answer to a CHECK code is a simple (ACK+j) where j is the last sequence number received.

In the block mode, transmission is started by an INIT1 code received at stage 10. In response to the INIT1 code, buffer memory 12 is cleared, mode register 27 is set to block mode, trailer register 26 is enabled along with trailer processing, sequence number counter 25 and byte counter 28 are reset to zero, and R1 register 22 is loaded with the AINIT code, to be transmitted in the next available byte window. The movable barrier 13 is moved to the head H of buffer 13 to make the data stored therein unavailable to stage 11 until after trailer processing (data block verification) is completed.

The data bytes, as received by stage 10, are loaded into buffer register 12, beginning at the barrier 13. As each data byte is passed to buffer register 12, byte counter 28 is incremented by one. At the end of the data block, trailer is received, consisting of a BOT (beginning of trailer) code, two bytes containing the length of the block (up to $2^{16}-1$ data bytes, low order bits first) and terminated by a SEQ code with the appropriate cyclic sequence number. The three bytes following the BOT code are placed in trailer register 26 where the length is compared to the count in byte counter 28 and the sequence number is compared to the (count+1) (modulo 8) in sequence counter 25. If both comparisons cause a match, an (ECHO+i) code is placed in buffer 12 and the barrier 13 is moved just past the ECHO code. This data block is now available to stage 11 which therefore begins passing the data bytes to line 14. Byte counter 28 is reset and sequence counter 25 is incremented by one, modulo 8, in preparation for reception of the next data block.

If either of the tests (length and sequence number) fail, the data behind barrier 13 is discarded as erroneous by moving the tail T over to the barrier B location. An (REJ+j) code (where j is the value in sequence counter 25) is then loaded into the buffer 12 at the new tail T position and barrier 13 moved over one place to make the REJ code available to stage 11. When the ECHO code or REJ code reaches the head H of buffer register 12, it is placed in R2 register 24 by stage 11 to be sent back to the remote receiver.

If an ECHO or REJ code is lost in transmission to the remote receiver, a timeout occurs, causing the ENQ code to be transmitted, as in the character mode. The CHECK code is used just like the ENQ code in some transmitters, but only for error control, and may have a shorter timeout. In a Type 5 system, the data block must be retained at the transmitter until an acknowledgement is received (to permit retransmission if an REJ is received). The answer to a CHECK code is a simple (ACK+j) where j is the last sequence number received, stored in sequence counter 25, to be used as a check at the transmitter on the retained block sequence number.

It can be seen that the receiver 100 of the figure is capable of receiving data streams in types 1, 2, 3, 4 and 5 formats and supply all of the protocols necessary to support transmission of all of these various data streams. In Type 1 data streams, the INIT0/AINIT interchange can be omitted if the receiver has a default character mode setting when initially enabled. Alternatively, for any mode, the request for service could include the mode of the transmitter, and the answer could include the mode of the receiver. If they matched, no initial handshake would be necessary. If the receiver at one end of a circuit wishes to know the mode setting of transmitter, an INITREQ code can be sent to which the response is INIT0 or INIT1, depending on the transmitting mode. The AINIT response confirms reception of INIT0 or INIT1.

The buffer memory 12 may well be implemented in the internal memory of the host computer. This causes no problems as long as the movable barrier restrictions are implemented and the transmitter 15 has access to the control codes loaded into the buffer store.

It is also possible to operate the receiver 100 in a multiplex mode in which several different types of data streams are multiplexed together. In that event, each different data stream would occupy one uniquely assigned time-derived channel. It would, of course, then be necessary to demultiplex and separate the signals. Each data stream would then have its own buffer register, but trailer processing and byte handling circuits could be time-shared by all of the channels. A buffer register arrangement suitable for multiplexed operation is disclosed in the copending application of A. G. Fraser, Ser. No. 407,885, filed AUG. 13, 1982, since issued as U.S. Pat. No. 4,499,576 on Feb. 12, 1985.

It will be noted that there are three different kinds of BOT codes in Table 2 (BOT, BOTM and BOTS). All three of these codes are suitable for beginning a trailer, but the latter two are used for somewhat different trailer processing. A BOTS beginning of trailer code is used for a so-called S-type. The S-type block is used in type 3 and type 4 data streams that utilize error detection, but no error correction. If a block has been deleted due to an error, the sequence numbers of all following blocks will be in error in Type 3 systems. The BOTS code can be used in an S-type block in such a system to cause an increment in the sequence counter 25 for both correct and incorrect blocks. The BOTM code is used in some systems to support a higher level framing scheme in which a frame consists of several BOTM blocks followed by a regular (BOT) block.

The unsequenced block codes BOU and EOU may be used to send small amounts of data which bypass the flow control mechanism in order to send expedited data in higher level protocols.

The reaction of the receiver 100 of the figure to all of the control codes will now be described for completeness. When an ENQ control character is received by stage 10, F register 21 is set to "1" and R1 register 22 is loaded with (ACK+j) where j is the sequence number in sequence counter 25. The ENQ code also clears trailer buffer register 26 and deletes any data behind barrier 13.

When a CHECK control code is received, it behaves identically to an ENQ code, except that F register 21 is not set, used to indicate that ENQ control character was not received.

When an INIT1 control code is received, buffer memory 12 is cleared and trailer processing is enabled by setting mode register 27. Sequence counter 25 and byte counter 28 are set to zero, and R1 register 22 is loaded with a AINIT code. If an INIT0 code is received, mode register 27 is reset to disable trailer processing and R1 register 22 is loaded with AINIT.

If a BOT (or BOTS or BOTM) control code is received, the BOT code and the following two bytes are loaded into trailer register 26. If a data character (instead of a SEQ code) immediately follows these three bytes, trailer register 26 is cleared, thereby ignoring corrupted trailers.

If an unsequenced message, i.e., messages proceeded by a BOU code, terminated by an EOU code, and including exactly two data bytes therebetween, is received, it is passed immediately to the host without processing in FIG. 1.

If a (SEQ+i) code is received while in the character mode (mode register 27 reset), it is translated into an (ECHO+i) code and transferred directly to buffer register 12 and the barrier 13 moved just pass the ECHO code to permit stage 11 to access to the ECHO code.

If a (SE0+i) code is received while trailer processing is enabled (mode register 27 set), i is compared to (sequence number+1) (modulo 8) in sequence counter 25 and the length in trailer register 26 is compared to the byte count in counter 28. If either test fails, the data behind barrier 13 is discarded by setting the tail T of register 12 to the position of barrier 13. If the beginning of trailer code is a BOTS when a test fails, sequence counter 25 is set to i and (ECHO+i) is placed in buffer 12. Otherwise, an REJ code, followed by the sequence number in counter 25, is placed in buffer 12. The barrier 13 moved to make this code available to stage 11.

If the tests succeed when a (SEQ+i) code is received, counter 25 is set to i and an (ECHO+i) is shifted into buffer 12. The barrier 13 is then moved to the tail T to make the entire block of data available to stage 11.

Stage 11 of the receiver handles interfacing with the host machines. Thus the level A protocols match that of the host machine. Bytes are passed, one at a time, from buffer 12 to the output line 14 in this level A protocol. If an (ECHO+j) or (REJ+j) code is retrieved from buffer 12, the code is transferred to R2 register 24 instead of to line 14. When loaded, the status bit in register 24 is set to signal transmitter 15 to transmit the stored code.

The various transmitters which will operate satisfactorily with the receiver 100 of the figure can be readily fabricated by anyone skilled in the art. However, to illustrate the appropriate transmitter logic, software implementations of the various types of transmitters are illustrated in Tables 3 through 7. These transmitter implementations are written in high level pseudo-code for ease in reading.

TABLE 3

TYPE 1 TRANSMITTER

Comment: input is an infinite data source
partitioned into eight-bit data
bytes
array input (0, inf.)
i=0
main procedure
for (i=0, ) {
send input (i)
i=i+1
}
end

TABLE 4

TYPE 2 TRANSMITTER

Comments: R is the value of the last ECHO number received.
S is the value of the next (SEQ)
number to be sent.
rec is an envelope received from the receiver.
TIMEOUT is a fixed time between the receipt
of the last echo and the transmission of an
inquiry for receiver status.
array input (0, inf.)
R=0; S=1; i=0
N = blocksize
main procedure
send INIT0
wait for AINIT
while (true) {
while (S≠R){
send input (i)
if ($i_{modN}$ = 0) {
send (SEQ+S)
S=(S+1) MOD8
}
}
if rec = ECHO + j
R=j
if time = TIMEOUT
send (ENQ) }
end

TABLE 5

TYPE 3 TRANSMITTER

Comments: block is an infinite array of blocks of N
eight-bit data bytes, where N = BLOCKSIZE
L1 is the low-order bits of N
L2 is the high-order bits of N
array block (0, inf.)
main procedure
send INIT1
wait for AINIT
for (i=0, ) {
send block (i)
send BOTS, L1, L2, (SEQ + (i+1)$_{MOD8}$)
}
end

TABLE 6
TYPE 4 TRANSMITTER

```
array block (0, inf.)
R=0; S=1; i=0
main procedure
send INIT1
wait for AINIT
while (true) {
while (S≠R) {
send block(i)
send BOTS, L1, L2, (SEQ + S)
S=(S+1)_MOD8
i = i + 1
}
if rec = ECHO + j
R=j
if time = TIMEOUT
send ENQ
}
end
```

TABLE 7
TYPE 5 TRANSMITTER

```
Comment: FIRSTREJ is a logical
variable which is true or false
array blocks (0, inf.)
S=1; R=0; i=0; FIRSTREJ = True
main procedure
send INIT1
wait for AINIT
while (true) {
while (S≠R) {
send block(i)
send BOTS, L1, L2, SEQ + S
i=i+1
S=(S+1)_MOD8
}
if rec = ECHO + j {
FIRSTREJ = True
R=j
}
if rec = REJ + j {
if (FIRSTREJ) {
i = i - (S - j-1)_MOD8
R = j
S=(j+1)_MOD8
FIRSTREJ = False
}
}
if rec = ACK + j {
i = i - (S - j-1)_MOD8
S=(j+1)_MOD8
}
if time = TIMEOUT {
send ENQ
}
}
end
```

Finally, to make this disclosure complete, a pseudo-code implementation of the receiver 100 of the figure is shown in Tables 8 and 9, representing stage 1 and stage 2, respectively.

TABLE 8
UNIVERSAL PROTOCOL RECEIVER STAGE 1

```
Comments: H is the location of the head of a
FIFO register PD.
T is the location of the tail of
FIFO register PD.
B is the current location of a movable
barrier within FIFO register PD.
SEQNO is the value of the current sequence
number.
MODE is a two-valued variable equal to
CHAR for the character mode and BLOCK
for the block mode.
```

TABLE 8-continued
UNIVERSAL PROTOCOL RECEIVER STAGE 1

```
LGTH is the count of the data block in
bytes, as received.
main procedure
MODE = CHAR
T=B=H=0
LGTH = SEQNO = 0
While (true) {
if input = data {
PD(T) = input
T=T+1
LGTH=LGTH+1
if MODE=CHAR
B=T
}
if MODE=CHAR and input=SEQ + i{
PD(T) = ECHO +i
T=T+1
B=T
}
if MODE=BLOCK and input=BOT/BOTM/BOTS,L1,
L2,SEQ+i {
if i=(SEQNO+1)_MOD8) and L1,L2=LGTH {
PD(T) = ECHO+i
T=T+1
SEQNO=i
LGTH=0
B=T
}
if input=ENQ {
T=B
LGTH = 0
send LASTECHO
send ACK + SEQNO
}
if input = CHECK {
T=B
LGTH = 0
send ACK + SEQNO
}
if input = INIT0 {
T=0
B=0
H=0
LGTH = 0
SEQNO = 0
MODE = CHAR
send AINIT
}
if input = INIT1 {
T=0
B=0
H=0
LGTH = 0
SEQNO = 0
MODE = BLOCK
Send AINIT
}
if input = ECHO + i
give (ECHO + i) to local transmitter
if input = REJ + i
give (REJ + i) to local transmitter
if input = ACK + i
give (ACK + i) to local transmitter
if input = AINIT
give AINIT to local transmitter
}
end
```

TABLE 9
RECEIVER STAGE 2

```
main procedure
while (H ≠ B) {
if PD(H) = data
send date to host
if PD(H) = ECHO + j {
send ECHO + j
```

TABLE 9-continued

```
RECEIVER
STAGE 2
LASTECHO = ECHO + j
}
if PD(H) = REJ + j {
send REJ + j
LASTECHO = REJ + j
}
H + H + 1
}
end
```

What is claimed is:

1. A data receiver including:

a first-in, first-out buffer storage means, a movable barrier in said storage means for dividing said storage means into two parts, means for storing received data in one of said parts beginning at a storage location adjacent to said barrier and ending at an end location away from said barrier, means for processing said received data in said one part, means for moving said barrier to said end location after processing by said processing means, and means for limiting access to the other of said two parts.

2. The data receiver according to claim 1 further comprising:

means for inserting data into said buffer storage means behind said barrier as said data is received.

means for checking said data, and means for moving said barrier behind said data following the successful operation of said check means.

3. The data receiver according to claim 2 further comprising:

means for removing data from said storage means only ahead of said barrier.

4. A method of receiving a digital data stream from a remote transmitter comprising the steps of passing said data through a first receiving stage for processing command codes interspersed in said data stream, storing said data in a first-in, first-out storage buffer under the control of said command codes, error-processing data stored in said storage buffer, removing said data from said storage buffer by a second receiving stage, passing said data on to a data utilization device, and maintaining a moveable barrier within said storage buffer for rendering a portion of said storage buffer not processed by said error-processing step unavailable to said second receiving stage.

5. The method of receiving a digital data stream according to claim 4 further comprising the steps of generating a response to certain of said command codes in a character mode data stream which responses can be used at a remote transmitter to implement flow control operations.

6. The method of receiving a digital data stream according to claim 4 further comprising the steps of identifying unique trailer blocks of data in said data stream, and generating reply codes in response to the processing of said trailer blocks.

7. The method of receiving a digital data stream according to claim 6 further comprising the steps of disassembling said trailer block into a beginning-of-trailer code, a length code and a sequence number code.

8. The method of receiving a digital data stream according to claim 7 further comprising the steps of detecting and correction errors in said data stream in response to said disassembled trailer block.

9. A method for processing data in a receiver including a first-in, first-out buffer storage means and a movable barrier in said storage means for dividing said storage means into two parts, comprising:

a step of storing received data in one of said parts beginning at a storage location adjacent to said barrier and ending at an end location away from said barrier, a step of processing said received data in said one part, a step of moving said barrier to said end location after processing by said processing means, and a step of limiting access to the other of said two parts.

* * * * *